(12) United States Patent
Rohn

(10) Patent No.: US 10,772,284 B2
(45) Date of Patent: Sep. 15, 2020

(54) FILTRATION APPARATUS FOR FLOWABLE MATERIAL

(71) Applicant: Land O'Lakes, Inc., Arden Hills, MN (US)

(72) Inventor: Steve Rohn, Tulare, CA (US)

(73) Assignee: LAND O'LAKES, INC., Arden Hills, MN (US)

( * ) Notice: Subject to any disclaimer, the term of this patent is extended or adjusted under 35 U.S.C. 154(b) by 735 days.

(21) Appl. No.: 15/217,588

(22) Filed: Jul. 22, 2016

(65) Prior Publication Data

US 2018/0021706 A1 Jan. 25, 2018

(51) Int. Cl.
*A01J 15/12* (2006.01)
(52) U.S. Cl.
CPC ..................................... *A01J 15/12* (2013.01)
(58) Field of Classification Search
None
See application file for complete search history.

(56) References Cited

U.S. PATENT DOCUMENTS

| 586,724 | A | * | 7/1897 | Edmonds | |
|---|---|---|---|---|---|
| 4,376,053 | A | * | 3/1983 | Bullock | A01J 5/0134 210/767 |
| 5,106,499 | A | * | 4/1992 | Davis | B01D 25/172 210/225 |
| 5,110,466 | A | * | 5/1992 | Tanii | B01D 25/172 210/225 |
| 5,230,798 | A | * | 7/1993 | Rogman | B01D 29/23 210/447 |
| 5,985,158 | A | * | 11/1999 | Tiderington | B01D 29/35 210/767 |

* cited by examiner

*Primary Examiner* — Jonathan M Peo
(74) *Attorney, Agent, or Firm* — Dorsey & Whitney LLP

(57) ABSTRACT

A filtration apparatus includes a screen assembly with a screen having a plurality of through holes, a slidable support to support the screen, and a retainer plate to slidably engage the support for securing the screen between the support and the plate. The support and the plate each define an opening aligned with the plurality of through holes such that a flowable material, such as butter, can pass through the screen. A housing of the filtration apparatus includes a screen assembly receiving portion configured to slidably receive the screen assembly, and a throughput portion for receiving a flowable material that extends through the housing in a direction transverse to the screen assembly receiving portion. A transition couples the housing to a supply line and is for delivering the flowable material to the housing.

15 Claims, 9 Drawing Sheets

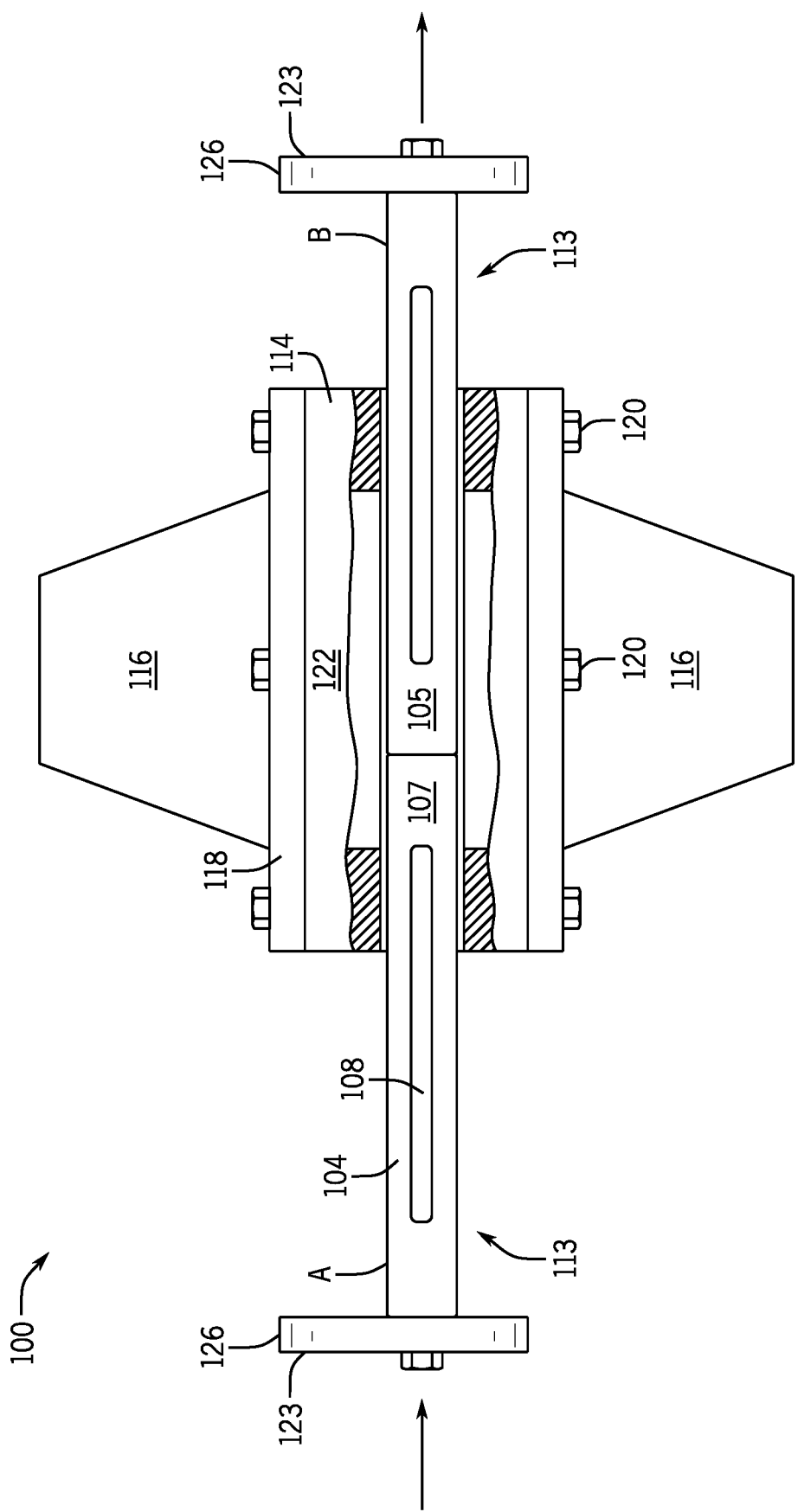

FILTRATION APPARATUS FOR FLOWABLE MATERIAL

TECHNICAL FIELD

The present disclosure relates to apparatuses for processing flowable materials, such as butter. More particularly, the present disclosure provides apparatuses for filtering flowable materials that include a screen and components for slidably inserting the screen into a supply line.

BACKGROUND

Various flowable materials, such as butter and butter substitutes, are commonly manufactured in continuous fashion, passing through various equipment components in a supply line as one unbroken mass. Before the butter can be ultimately packaged and the final product shipped, it must be thoroughly filtered to ensure that all unsafe, unsanitary, or otherwise unwanted debris is removed. Filtration protocols may involve passing the butter through a fine screen, or "noodle plate," to physically block such debris from advancing to subsequent processing stages.

While a screen may initially provide adequate filtration of the butter, debris often accumulates on the screen over time and causes the screen to clog, thereby generating backpressure in the supply line, increasing the risk of contamination and reducing the overall effectiveness of the filtration process. Periodic replacement of the screen is thus necessary to ensure consistent, thorough filtration of the butter, a task that significantly complicates butter processing. In particular, the constant flow of butter through the supply line generates large volumes of wasted butter upon even briefly disconnecting any inline filtration equipment. In addition, several machine operators may be needed to disconnect the supply line, disassemble the filtration equipment, replace the screen, reassemble the filtration equipment, and realign the supply line, all while controlling the messy conditions caused by wasted butter spilling from the disconnected line. Prolonged disconnection of the filtering equipment to exchange one filtering screen for the next may also result in extended shutdowns of butter processing. Thus, improved filtering apparatus better equipped for continuous butter processing is needed to decrease waste, improve sanitation and increase throughput.

SUMMARY

In some embodiments, a filtration apparatus includes a screen assembly with a screen comprising a plurality of through holes; a slidable support configured to support the screen; and a retainer plate configured to slidably engage the support and secure the screen between the support and the plate. The support and the plate each defining an opening aligned with the plurality of through holes such that a flowable material can pass through the screen. A housing of the filtration apparatus includes a screen assembly receiving portion configured to slidably receive the screen assembly; and a throughput portion comprising an opening extending through the housing in a direction transverse to the screen assembly receiving portion and configured to receive the flowable material. A transition port couples the housing to a supply line and is for delivering the flowable material to the housing.

In certain implementations and alternatives, the screen is configured such that a volume of flowable material passing through the through holes of the screen is at least as great as a volume of flowable material passing through the supply line.

In certain implementations and alternatives, at least one end cap is configured to couple the screen assembly to the housing. The end cap may be releasably coupled to the screen assembly. The end cap may be supported on a loading surface extending horizontally from a side of the housing defining the screen assembly receiving portion. The at least one end cap may include at least one handle, which may be offset from a vertical center of the end cap to define a first side and a second side of the end cap such that when supported on the surface, and the screen assembly may be coupled to the end cap aligns with the screen assembly receiving portion when the first side of the end cap is supported on the surface and is misaligned with the screen assembly receiving portion when the second side of the end cap is supported on the surface. In addition or alternatively, the slidable support of the screen assembly may be offset from a vertical center of the end cap, a distance between the loading surface and the screen assembly receiving portion corresponding to a distance between a first side of the end cap and the slidable support of the screen assembly, and the screen assembly aligning with the screen assembly receiving portion when the first side of the end cap is supported on the surface and is misaligned with the screen assembly receiving portion when a second side of the end cap, opposite the first end, is supported on the surface.

In certain implementations and alternatives, the screen assembly receiving portion includes a side wall with a beveled edge and the screen assembly also includes a side wall with a beveled edge and configured to align with the beveled edge of the screen assembly receiving portion.

In certain implementations and alternatives, the opening of the screen assembly receiving portion extends through the housing from a first end to a second end opposite the first end and is configured such that the screen assembly is receivable at each of the first end and the second end. In such implementations and alternatives, the opening may be configured to simultaneously accommodate a portion of the screen assembly at the first end and another screen assembly at the second end such that the screen assembly may be slidably ejected at the first end as the another screen assembly is slidably received at the second end.

In certain implementations and alternatives, at least one cover assembly is pivotably coupled to a first side of the housing and includes an end plate configured to expose the screen assembly receiving portion in an open position and secure the screen assembly within the housing in a closed position.

In other embodiments, a filtration apparatus includes a screen assembly with a screen having a plurality of through holes; and a slidable support configured to support the screen. The support includes a side wall with a beveled edge and additionally defines an opening aligning with the plurality of through holes such that a flowable material can pass through the screen. A housing of the filtration apparatus includes a screen assembly receiving portion configured to slidably receive the screen assembly. This receiving portion may include a side wall with a beveled edge configured to align with the beveled edge of the slidable support. A throughput portion of the housing includes an opening extending through the housing in a direction transverse to the screen assembly receiving portion and is configured to receive a flowable material. A transition port couples the housing to a supply line for delivering the flowable material to the housing.

In certain implementations and alternatives, the at least one end cap is configured to couple the screen assembly to the housing. The end cap may be releasably coupled to the screen assembly. The end cap may be supported on a loading surface extending horizontally from a side of the housing defining the screen assembly receiving portion.

In certain implementations and alternatives, the opening of the screen assembly receiving portion may extend through the housing from a first end to a second end opposite the first end, the opening configured such that the screen assembly is receivable at each of the first end and the second end. In certain implementations and alternatives, the opening may be configured to simultaneously accommodate a portion of the screen assembly at the first end and another screen assembly at the second end such that the screen assembly is slidably ejected at the first end as the another screen assembly is slidably received at the second end.

In still other embodiments, a filtration apparatus includes a screen assembly with a screen and a slidable support configured to support the screen that defines an opening for aligning with the plurality of through holes such that a flowable material can pass through the screen. A housing includes a screen assembly receiving portion configured to slidably receive the screen assembly; and a throughput portion comprising an opening extending through the housing in a direction transverse to the screen assembly receiving portion configured to receive a flowable material. At least one cover assembly is pivotably coupled to a first side of the housing and includes an end plate configured to expose the screen assembly receiving portion in an open position and secure the screen assembly within the housing in a closed position.

According to certain implementations and alternatives, the cover assembly includes a locking member pivotably coupled thereto and configured to releasably engage the housing.

BRIEF DESCRIPTION OF THE DRAWINGS

FIG. 5 is a schematic illustration of a cross-sectional side view of an embodiment of a filtration apparatus showing the housing simultaneously accommodating a portion of two screen assemblies within a screen assembly receiving portion.

DETAILED DESCRIPTION

Provided herein are apparatus for filtering various flowable materials during processing, such as butter or butter substitutes. The apparatus include a screen that may be periodically replaced without disconnecting a supply line, thereby lessening the time and number of personnel required to replace each screen compared to replacement protocols applied to preexisting filtration apparatus. For instance, the filtration apparatus disclosed herein may include a screen assembly configured to slide into and out of a housing connected to a supply line, thus facilitating replacement of the screen. The screen assembly may include a screen and a slidable support configured to support the screen. In embodiments, a retainer plate configured to secure the screen within the slidable support may also be included in the screen assembly. One or more adaptors or transition ports may connect the housing to the supply line to adjust the volume of flowable material passing through the screen, thus preventing the filtration apparatus from generating backpressure in the supply line.

Figure 1:
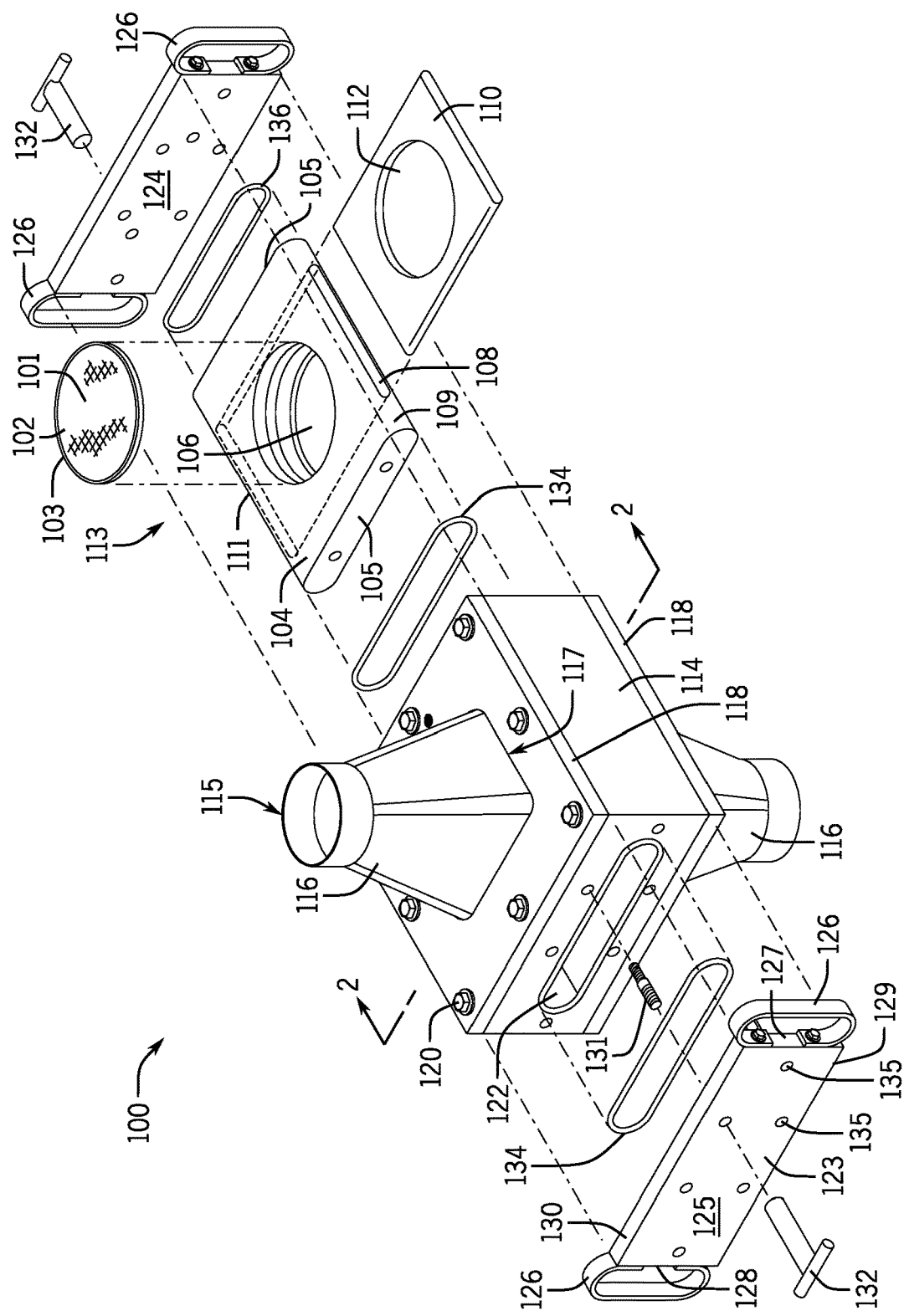
FIG. 1 is a schematic illustration of a perspective exploded view of an embodiment of a filtration apparatus.

Referring to the drawings, FIG. 1 illustrates a filtration apparatus 100 that includes a slidable support 104 that defines a screen-receiving opening 106 for a "noodle plate" or screen 102. A retainer plate 110 for securing the screen 102 within the slidable support 104 may be inserted into a retainer plate receiving portion 108 defined by the slidable support 104. Together, the screen 102, slidable support 104 and retainer plate 110 may comprise a screen assembly 113 that may be slidably inserted into and removed from at least one screen assembly receiving portion 122 defined by the housing 114. To secure the screen assembly 113 within the housing 114 and close each screen assembly receiving portion 122, one or more end caps 123 may be fastened to an outer surface of the housing 114 using one or more fasteners 131 and complementary fastening members 132. Mechanical gaskets 134, e.g., O-rings, may be sandwiched between the housing 114 and an inner surface 124 of each end cap 123 to seal the connection. An end cap 123 may also be coupled to an end of the slidable support 104, thus providing a broad surface for receiving a lateral force needed to insert the screen assembly 113 into the housing 114. Each end cap 123 may also include one or more handles 126 to facilitate user handling and ensure proper alignment of the screen assembly 113 with the screen assembly receiving portion 122. Two transition ports 116 positioned on opposite sides of the housing 114 may connect the housing to a supply line (see, e.g., supply line 146 in FIG. 7) containing a flowable material. By slidably moving the screen assembly 113 into and out of the housing 114, less time may be necessary to replace the screen 102 in comparison to replacement methods used to replace screens from preexisting filtration apparatuses. Screen replacement may be accomplished without disconnecting the apparatus from the supply line containing the flowable material.

As shown in FIG. 1, the screen 102 may include a plurality of through holes 101 circumferentially-surrounded by an external circumferential portion 103 of the screen 102 that defines the external shape of the screen. The external circumferential portion 103 may be generally free of through holes 101 and may provide a support surface for contacting, e.g., the slidable support 104. The shape and size of the screen 102 may vary depending on the type, volume, flow rate, and/or flow direction of flowable material passing through a supply line, for example. The size and/or shape of the screen 102 may also vary depending on the size and/or shape of other components included in the filtration apparatus 100, such as the slidable support 104 or the housing 114. As depicted in FIG. 1, the screen 102 may be disc-like, with an approximately circular perimeter. In embodiments, the screen 102 may be approximately square, rectangular, elliptical, hemispherical, triangular, or any other shape suitable for filtering a flowable material. The screen 102 may be substantially flat or arcuate. In some examples, the size and/or shape of the screen 102 may vary depending on the filtration stage for which the screen is used. For example, larger screens ranging from about 45 to about 55 square inches in surface area may be used for filtering flowable material into bulk filling equipment, e.g., WAL Bulk Packer; while smaller screens ranging from about 25 to about 35 square inches in surface area may be used for high-speed filling equipment, sometimes referred to as "printers." In some examples, even smaller screens, e.g., about 10 to about 15 square inches in surface area, may be implemented for hopper fillers or printers. In embodiments, the screen 102 may have a width or diameter ranging from about 2 to about 12 inches, about 2 to about 10 inches, about 3 to about 5 inches, about 4 to about 7 inches, or about 6 to about 9 inches. The corresponding surface area of the screen 102 may range from about 3 to about 15 square inches, about 6 to about 18 square inches, about 10 to about 14 inches, about 15 to about 35 square inches, about 25 to about 30 inches square inches, about 30 to about 60 square inches, about 45 to about 55 square inches, or about 48 to about 52 square inches.

The plurality of through holes 101 enclosed within the external circumferential portion 103 of the screen 102 may vary in size, shape and/or density. The diameter or width of each through hole may vary depending on the specific particles targeted for removal. In embodiments, each through hole may be approximately circular, with a diameter ranging from about 0.03 to about 0.1 inches, about 0.04 to about 0.08 inches, about 0.05 to about 0.07 inches, about 0.06 to about 0.065 inches, or any other diameter adequate to filter debris from a flowable material.

The spacing, density, and overall arrangement of the through holes 101 on the screen 102 may vary. In some examples, the through holes 101 may be uniformly spaced throughout a given screen 102. The through holes 101 may also be more closely spaced or further apart in one or more localized areas within a given screen 102. In embodiments, the through holes 101 may be spaced apart relative to each other by a distance ranging from about 0.01 to about 0.05 inches, about 0.02 to about 0.04 inches, about 0.025 to about 0.035 inches, or any distance suitable for filtering a flowable material.

In embodiments, the screen 102 may include multiple layers of through holes 101. In some examples, each layer may be offset by a distance from an adjacent layer. In some examples, the individual through holes 101 of each layer in a multi-layered screen may have different sizes, such that each successive layer is progressively finer or more coarse. A multi-layered screen may improve filtration effectiveness by reducing the number of contaminants able to pass through the screen 102.

The screen 102 may be made from various materials. In some embodiments, the screen 102 may be made of one or more materials including but not limited to: wire, nylon, steel, one or more metals, one or more polymers and/or any combination thereof. Such materials may be netted or meshed to form the plurality of through holes 101 defined by the screen 102.

The screen 102 may be used to filter various flowable materials, each with varying viscosities and compositions. Such materials may be naturally flowable at room temperature, or in a flowable state due to exposure to increased temperatures and/or moisture during processing. The flowable materials may include but are not limited to: butter, butter products, butter substitutes, assorted cheeses, assorted creams, liquids, and/or any combination thereof.

As shown in FIG. 1, the screen 102 may be placed within the screen-receiving opening 106 defined by the slidable support 104. In embodiments, the screen-receiving opening 106 may be approximately cylindrical to accommodate the circular screen 102, and may extend through the body of the slidable support 104 and include an internal circumferential lip or support structure for supporting the external circumferential portion 103 of the screen 102 while leaving the through holes 101 of the screen 102 exposed. Thus, the slidable support 104 and the screen 102 assembled therewith allows for the passage of a flowable material through the screen 102. Particularly, to support a first end of the screen 102, the screen-receiving opening 106 may define an opening with an internal circumference that is smaller than the external circumferential edge 103 of the screen 102. Thus, the screen 102 may rest upon an internal circumferential portion of the screen-receiving opening 106. The size of the screen-receiving opening 106 may be similar to or larger than the internal periphery of through holes 101 defined by the screen 102 to avoid interfering with the passage of flowable material through the screen 102. In embodiments, the diameter of the internal circumferential portion used to support a first end of the screen 102 may vary, ranging from about 1.5 inches to about 12.5 inches, about 2 to about 12 inches, about 2 to about 10 inches, about 3 to about 5 inches, about 4 to about 7 inches, or about 6 to about 9 inches.

The slidable support 104 may be constructed from various materials. In embodiments, the slidable support 104 may be made of one or more materials including but not limited to: nylon, one or more polymers or plastics, e.g., polyethylene terephthalate, one or more metals, steel, stainless steel, various composite materials and/or combinations thereof.

In embodiments, a second end of the screen 102, opposite the first end, may be secured within the slidable support 104. To secure the second end of the screen 102, a retainer plate 110 may be slidably inserted into a retainer plate receiving portion 108 defined by the slidable support 104. In particular, the body of the slidable support 104 may be approximately rectangular, defining end surfaces 105 and 107, and side surfaces 109 and 111. The laterally extending retainer plate receiving portion 108 may be defined by an opening, slot or aperture that begins on one or more side surfaces 109 and/or 111. In some examples, the retainer plate receiving portion 108 may extend through the slidable support 104 to define a lateral through hole transverse to the screen-receiving opening 106, such that the retainer plate 110 may be received through the side surface 109 and/or 111. In embodiments, the retainer plate receiving portion 108 may extend to only one side surface 109 or 111, such that the retainer plate 110 may be inserted and removed through only one side of the slidable support 104. In some examples, the retainer plate receiving portion 108 may extend laterally from one or more end surfaces 105 and/or 107. Thus, various embodiments of the slidable support 104 may be configured to receive the retainer plate 110 through multiple surfaces and/or in multiple directions.

The retainer plate 110 may have a substantially flat body sized and shaped for slidable insertion into the retainer plate receiving portion 108. After placement of the screen 102 into the screen-receiving opening 106, the retainer plate 110 may be slidably inserted into the retainer plate receiving portion 108 over the screen 102, thus securing the screen 102 between the slidable support 104 and the retainer plate 110. The retainer plate 110 may define an opening 112 with an internal circumference that is smaller than the external circumferential portion 103 of the screen 102 but larger than the internal periphery of the screen 102 so that the through holes 101 of the screen 102 are exposed at the opening 112. Once inserted within the slidable support 104, the opening 112 may align with the screen-receiving opening 106 and the internal periphery of the screen 102 such that a flowable material may pass unimpeded through the screen assembly 113. In embodiments, the diameter of the opening 112 may vary, ranging from about 1.5 inches to about 12.5 inches, about 2 to about 12 inches, about 2 to about 10 inches, about 3 to about 5 inches, about 4 to about 7 inches, or about 6 to about 9 inches.

The retainer plate 110 may be made of various materials. In embodiments, the retainer plate 110 may be constructed of one or more materials including but not limited to: nylon, one or more polymers or plastics, e.g., polyethylene terephthalate, one or more metals, steel, stainless steel, various composite materials and/or combinations thereof.

The length and width of the retainer plate 110 may vary. To maintain a tight clearance between the retainer plate 110 and the retainer plate receiving portion 108, the dimensions of the retainer plate 110 may be slightly smaller than the inner dimensions of the retainer plate receiving portion 108. In embodiments, the width of the retainer plate 110 may range from about 4 inches to about 14 inches, about 5 inches to about 12 inches, about 6 inches to about 10 inches or about 7.5 inches to about 9.5 inches. The thickness of the retainer plate 110 may also vary, ranging from about 0.10 inches to about 1.5 inches, about 0.20 inches to about 0.60 inches, or about 0.25 inches to about 0.50 inches. The length of the retainer plate 110 may range from about 6 inches to about 24 inches, about 10 inches to about 20 inches, about 12 inches to about 18 inches, or about 14 inches to about 16 inches.

To facilitate insertion and removal of the screen assembly 113 with respect to the housing 114, the slidable support 104 may be releasably coupled to one or more mounting flanges or end caps 123. Each end cap 123 may form a panel that defines an inner surface 124, an outer surface 125, and surrounding outer perimeter including peripheral surfaces 127, 128, first end 129, and second end 130. The surfaces 124 and 125 may be substantially flat, planar and parallel to each other. To couple with the slidable support 104, each end cap 123 may include one or more through holes 135, each configured to receive a fastener, e.g., stud, screw, T-handle, pin, or bolt. Each fastener may protrude laterally outward from one or more external surfaces of the slidable support 104. In some examples, one or more fasteners may protrude laterally from the inner surface 124 of the end cap 123, each extending into a complementary receiving hole defined by the slidable support 104. In embodiments, the end cap 123 may couple with the slidable support 104 at the end surfaces 105, 107 and/or the side surfaces 109, 111. One or more mechanical gaskets 136, e.g., O-rings, may be secured between the slidable support 104 and the end cap 123. Once coupled to the end cap 123, the slidable support 104, and thus the screen assembly 113, may extend from the inner surface 124 at an approximately perpendicular angle. Because the end cap 123 may not be inserted into the housing 114 and thus does not make contact with the flowable material filtered therein, the end cap 123 may provide a surface for a user to apply an external force to, thereby facilitating insertion and removable of the screen assembly 113 with respect to the housing 114 without increasing the risk of contaminating the flowable material by reaching within the housing 114.

As depicted in FIG. 1, each end cap 123 may define peripheral surfaces 127 and 128 oriented perpendicular to the inner surfaces 124 and 125 of the end cap 123. In embodiments, at least one handle 126 may be coupled to the surfaces 127 and/or 128. Each handle 126 may define a vertically extending body graspable by a user to move or carry the end cap 123 with or without the screen assembly 113 coupled thereto. The shape of the handle 126 may vary. As shown, the handle 126 may include a curved, looped structure of unitary construction. In embodiments, the handle 126 may include a looped structure with defined corner portions. In some examples, the handle 126 may include a solid protuberance or knob portion. One or more handles 126 may be coupled to the end cap 123 or permanently affixed thereto. In some embodiments, one or more handles 126 may be integrally formed with the body of the end cap 123.

The positioning of each handle 126 with respect to the vertical center of the end cap 123 may define a first end 129 and a second end 130 of each end cap 123. In particular, one or more handles 126 may be offset from a vertical center of the end cap 123, thus distinguishing a first end 129 from a second end 130 based on the distance with which each handle 126 protrudes from the first end 129 and the second end 130. In some examples, at least one handle 126 may extend a greater distance above the second end 130 than the first end 129. In some examples, at least one handle 126 may extend above the second end 130, but may not reach the plane of the first end 129, i.e., the handle 126 may not extend vertically past the first end 129. The orientation of the end cap 123 may be used to ensure proper alignment of the screen assembly 113 with one or more openings defined by the housing 114 as described herein.

In embodiments, the end cap 123 may couple with the housing 114 in addition to or instead of the slidable support 104. For instance, the slidable support 104 may couple to the housing 114 via the end cap 123 being joined via releasable fasteners to each of the slidable support 104 and the housing 114. In particular, the inner surface 124 of the end cap 123 may be releasably coupled to one or more outer surfaces of the housing 114 at which the screen assembly receiving portion 122 is defined. To completely conceal each screen assembly receiving portion 122 of the housing 114, an outer perimeter of each end cap 123 may be larger than the external circumferential edge of the screen assembly receiving portion 122 of the housing 114. Thus, the end cap 123 may function as a cover for one or more openings defined by the housing 114, and additionally as a mounting flange for the screen assembly 113.

The end cap 123 may be coupled to the housing 114 through various means. In some examples, the end cap 123 may define one or more through holes 135 each configured to receive a fastener 131. The fastener 131 may include various releasable fasteners or fastener components, which may be elongated, threaded or smooth, including but not limited to: studs, screws, bolts and/or any combination thereof. In embodiments, each fastener 131 may project laterally outward from an outer surface of the housing 114. After receiving one or more fasteners through one or more through holes 135, the end cap 123 may be tightened and releasably secured to the housing 114 by engaging each fastener 131 with a complementary fastening member 132, e.g., wing nut, T-handle, threaded knob, nut, washer and/or any combination thereof. In some examples, the fastening member 132 may be tightened manually or using one or more tools. After tightening, the inner surface 124 of the end cap 123 may be flush with an outer surface of the housing 114 such that no gap exists between the two surfaces. In some examples, a mechanical gasket 134, e.g., O-ring, may be compressed between the end cap 123 and the housing 114 to seal the interface between the two components. Sealing the end cap 123 with the housing 114 may prevent the penetration of particle contaminants within the housing 114.

As shown in FIG. 1, the housing 114 may have a substantially rectangular, box-like body made from various materials including but not limited to: iron, one or more metals, steel, stainless steel, one or more polymers or plastics, various composite materials and/or combinations thereof. The size and/or shape of the housing 114 may vary. In some examples, the size and/or shape of the housing 114 may vary to accommodate differently sized and/or shaped screens 102 or transition ports 116. In embodiments, the housing 114 may be approximately cylindrical, spherical, hemispherical, square, elongated, elliptical, rhomboidal, rounded or any other shape. The body of the housing 114 may define the screen assembly receiving portion 122, and may be configured to couple with a supply line via one or more transition ports 116. A throughput portion 121 (see FIG. 2) defined by the housing 114 allows ingress of a flowable material via a transition port 116 (e.g., an upper transition port), passage of the flowable material through the housing 114, and egress of the flowable material into another transition port 116 (e.g., a lower transition port).

In embodiments, the screen assembly receiving portion 122 of the housing 114 may be positioned transverse to the throughput portion 121 of the housing 114 configured to receive a flowable material. The screen assembly 113 may be inserted within the housing 114 via the screen assembly receiving portion 122 so that the plurality of through holes 101 defined by the screen 102 are oriented in the same direction as flow is direction in the throughput portion 121 of the housing 114, e.g., vertically. To slidably receive the screen assembly 113, the screen assembly receiving portion 122 may include at least one opening, slot or aperture defined in the housing 114. The screen assembly receiving portion 122 may include a laterally-extending through hole defined by the housing 114, such that the screen assembly 113 is receivable at each of a first end and a second end of the housing 114. That is, the screen assembly 113 may be received via either of two sides of the housing 114. In some examples, the screen assembly receiving portion 122 may extend through a portion of the housing 114, such that the housing 114 may receive the screen assembly 113 through only one side. Thus, in various embodiments the housing 114 may accommodate unidirectional or bidirectional insertion and removal of the screen assembly 113 via the screen assembly receiving portion 122 as described herein.

In embodiments, the entrance of the screen assembly receiving portion 122 of the housing 114 may optionally include one or more bendable flaps to provide a barrier against the penetration of contaminants within the housing 114. Such flaps may extend radially inward over each opening, such that upon insertion of screen assembly 113 through the opening, the flaps are urged inwardly, toward the middle of the housing 114. After complete insertion of the screen assembly 113 within the housing 114, the flaps may return to their original position. Such flaps may be comprised of various flexible materials, e.g., rubber.

A circumferential edge of the screen assembly receiving portion 122 of the housing 114 may be complementary to the outer circumferential edge defined by the slidable support 104, such that the slidable support 104 may fit within the screen assembly receiving portion 122 with only a small gap or clearance. In embodiments, the circumferential gap or clearance between the outer surfaces of the slidable support 104 and the inner surfaces of the screen assembly receiving portion 122 may range from about 0.001 to about 0.010 inches. The tight clearance between the slidable support 104 and the screen assembly receiving portion 122 may prevent contaminants from occupying the space between the two components and may prevent slidable support from moving within the housing 114 once secured.

In some embodiments, the screen assembly receiving portion 122 may include a side wall with a beveled edge. The screen assembly 113 may include a complementary beveled edge, such that the beveled edge of the screen assembly 113 aligns with the beveled edge of the screen assembly receiving portion 122. Complementary beveled edges may ensure that the screen assembly 113 is not inserted into the screen assembly receiving portion 122 in an incorrect orientation, e.g., upside down.

As illustrated in FIG. 1, the housing 114 may be coupled to a supply line by one or more transition ports 116. In embodiments, the housing 114 may be connected to a supply line via two transition ports 116, which may be positioned on opposite sides of the housing 114, connecting the throughput portion 121 defined by the housing 114. One transition port 116 may funnel unfiltered flowable material from a supply line into the housing 114, while a second transition port 116 may funnel filtered flowable material from the housing 114 back into the supply line.

Each transition port 116 may comprise an elongate, hollow body with a first end 115 and a second end 117. The two ends may face in opposite directions. In embodiments, the body of the transition port 116 may curve or bend such that the two ends may face different, but not directly opposite, directions. Each end 115, 117 may define an opening, each opening having a different diameter or width (for non-circular openings). The opening defined by the first end 115 may couple directly with the supply line, and thus may have a diameter or width substantially equal to the width or diameter of the supply line. In embodiments, the opening at the first end 115 may be slightly narrower than the supply line if coupled circumferentially within the supply line, or slightly larger if coupled circumferentially around the exterior of the supply line.

The opening defined by the second end 117 of the transition port 116 may couple with the housing 114 or a flange 118, and may have a width or diameter greater than the width or diameter of the first opening. A larger second opening, opposite the supply line, may increase a volumetric area in the housing 114 relative to the volumetric area of the supply line. This increased volumetric area may correspond to or be larger than the screen 102, while the volumetric throughput through the plurality of through holes 101 may be equal to or larger than the volumetric area of the supply line. This allows for the flowable material to enter into the housing 114 and pass through the screen 102 at the same flow rate as the supply line, thus eliminating or at least reducing the backpressure that may otherwise build upstream in the supply line.

The shape of each transition port 116 may vary, for instance, depending on the size and shape of the supply line and the housing 114. In addition, variations in size and/or shape may maintain a constant flow rate of flowable material from the supply line, through the housing 114, and back into the supply line. As shown in FIG. 1, for example, the body of each transition port 116 may include a cylindrical portion that defines a first end 115 and an approximately rectangular portion that defines a second end 117. In embodiments, the body of the transition port 116 may widen in a linear fashion from a first end 115 to a second end 117, defining a cone-like shape with a rounded first end 115 and a rounded second end 117. In some examples, the body of the transition port 116 may curve outwardly from a first end 115 to a second end 117. In some examples, the second end 117 of the transition port 116 may define a shape customized to the shape of the opening defined by the housing 114. The shape of the second end 117 of each transition port 116, and in some cases the entire body of each transition port 116, may correspond to the shape of the throughput portion 121 defined by the housing 114 and/or the shape of the screen 102 placed therein. For example, a transition port 116 defining a rounded or approximately circular second end 117 may be used in embodiments that include a circular screen 102 and a cylindrical throughput portion 121.

A first end 115 of each transition port 116 may be attached to the supply line via various means. In some examples, the transition port 116 may be attached via various fasteners, bolts, screws, or clamps, e.g. c-clamps or swivel clamps. Some embodiments may include one or more valves for controlling the release of flowable material from the supply line into the transition port 116. One or more valves may be manipulated manually or automatically by a user to prevent a flowable material from entering the housing 114 during replacement of the screen 102, for example.

Each transition port 116 may be coupled to the housing 114 through various means, structures, and/or mechanisms. In embodiments, each transition port 116 may be secured to at least one collar or flange 118 positioned between an outer surface of the housing 114 and a second end 117 of the transition port 116. The flange 118 may vary in thickness, size and/or shape. In embodiments, the flange 118 may define an opening of the same size and shape defined by the throughput portion 121 of the housing 114. The outer edges of the flange 118 may be substantially flush with the outer edges of the housing 114. The flange 118 may be secured to an outer surface of the housing 114 via various fasteners 120, e.g., bolts, studs, and/or screws. In some examples, each transition port 116 may be secured to the flange 118 via one or more fastener members, e.g., studs, bolts, and/or screws. In some examples, one or more transition ports 116 may be permanently fixed to the housing 114 or integrally formed within the housing 114. Embodiments may lack the flange 118 altogether, with at least one transition port 116 secured directly to the housing 114. In some examples, at least one transition port 116 may include a circumferential lip portion that protrudes laterally outward from the second end 117 of the transition port 116, the lip defining one or more through-holes configured to receive various fasteners, bolts and/or screws that may project into the housing 114 or extend outwardly therefrom.

The transition ports 116 may be made of various materials. Such materials may be the same or distinct form the materials comprising the housing 114. In some examples, the materials used to form each transition port 116 may include but are not limited to: nylon, one or more polymers or plastics, one or more metals, steel, stainless steel, various composite materials and/or combinations thereof.

Figure 2:
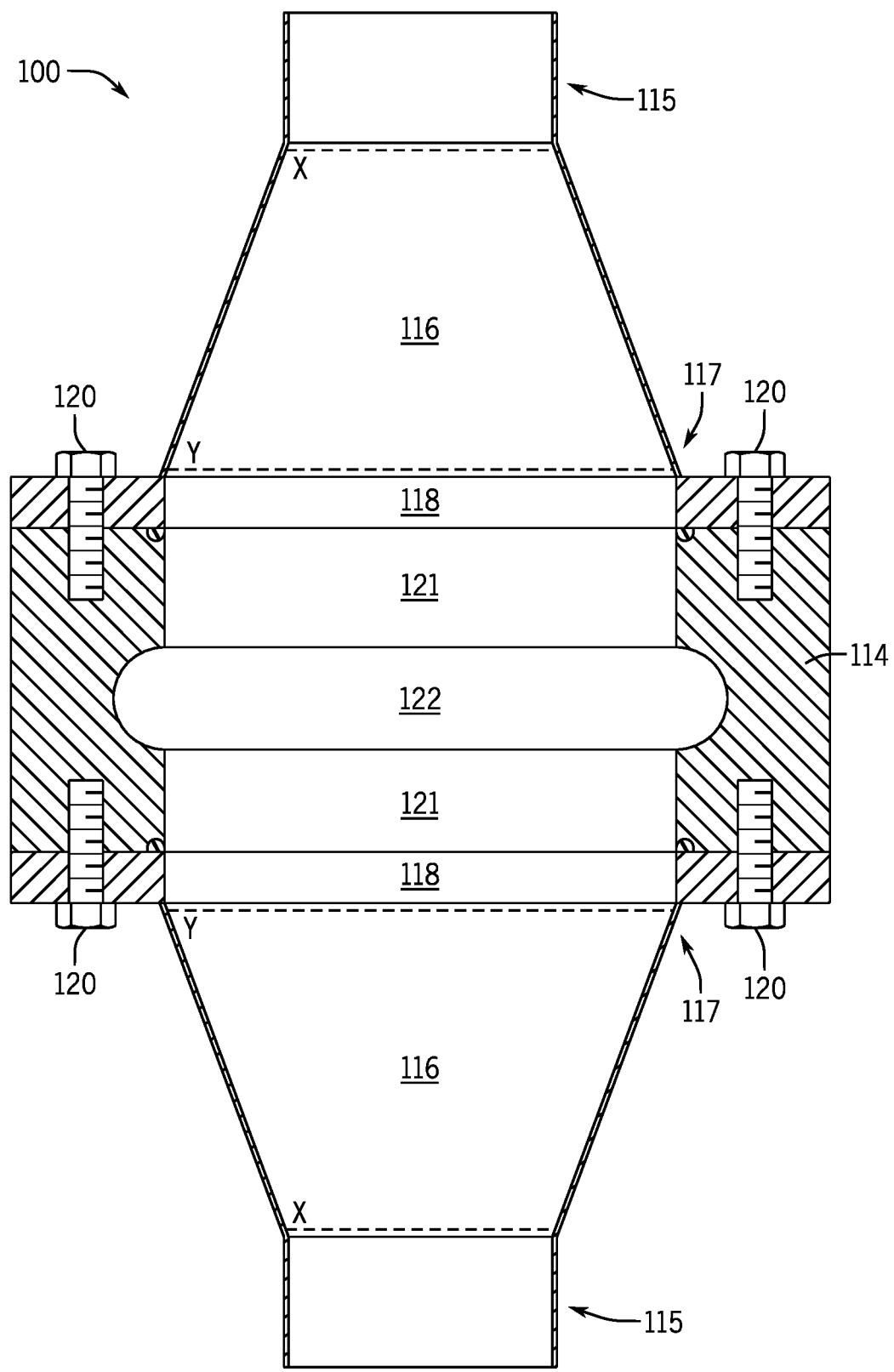
FIG. 2 is a schematic illustration of a cross-sectional side view of a housing of the filtration apparatus along line 2 of the embodiment shown in FIG. 1.

FIG. 2 is a schematic illustration of a cross-sectional side view of the housing 114 along line 2 of the embodiment illustrated in FIG. 1. As shown, the housing 114 may define the screen assembly receiving portion 122 that extends laterally through the body of the housing 114. A flowable material may pass through the housing 114 via the throughput portion 121 defined by the housing. The throughput portion 121 may extend through the housing 114 in a direction transverse to the screen assembly receiving portion 122 such that a flowable material intersects a screen assembly 113, and thus the screen 102, inserted within the screen assembly receiving portion 122.

FIG. 2 illustrates two transition ports 116 coupled to opposite sides of the housing 114, each aligned with the throughput portion 121. Each transition port 116 may include a first end 115 with a diameter or width x, and a second end 117 with a diameter or width y. The first end 115 may be connected to a supply line. Diameter or width y may be larger than diameter or width x to maintain a constant flow rate of flowable material within a supply line and through the housing 114. In embodiments, diameter or width x may range from about 2 to about 8 inches, about 2 to about 6 inches, about 3 to about 5 inches, about 3.5 to about 4.5 inches, about 3.8 to about 4.2 inches, or any other diameter or width compatible with variously sized supply lines. In some examples, the resulting surface area of the opening defined by the first end 115 may range from about 3 to about 50 square inches, about 3 to about 28 square inches, about 7 to about 20 square inches, about 10 to about 16 square inches, or about 11 to about 14 square inches. In embodiments, diameter or width y may range from about 4 to about 12 inches, about 5 to about 11 inches, about 6 to about 10 inches, about 7 to about 9 inches, or about 7.5 to about 8.5 inches. In some examples, the corresponding surface area of the opening defined by the second end 117 may range from about 12 to about 114 square inches, about 20 to about 95 square inches, about 28 to about 80 square inches, about 38 to about 64 square inches, or about 44 to about 56 square inches.

Each transition port 116 may be coupled to the housing 114 via a flange 118. As shown, one flange 118 may be secured to each of two opposing sides of the housing 114, where the flange may provide structural support, rigidity and/or a connection surface for securing one or more transition ports 116 to the housing 114. One or more flanges 118 may be secured to the housing 114 via one or more fasteners 120, which may each extend into the body of the housing 114. The fasteners 120 may be threaded or smooth and may include but are not limited to: various bolts, screws, studs and/or any combination thereof. In some examples, one or more mechanical gaskets, e.g., O-rings, may be positioned between each flange 118 and the housing 114.

Figure 3:
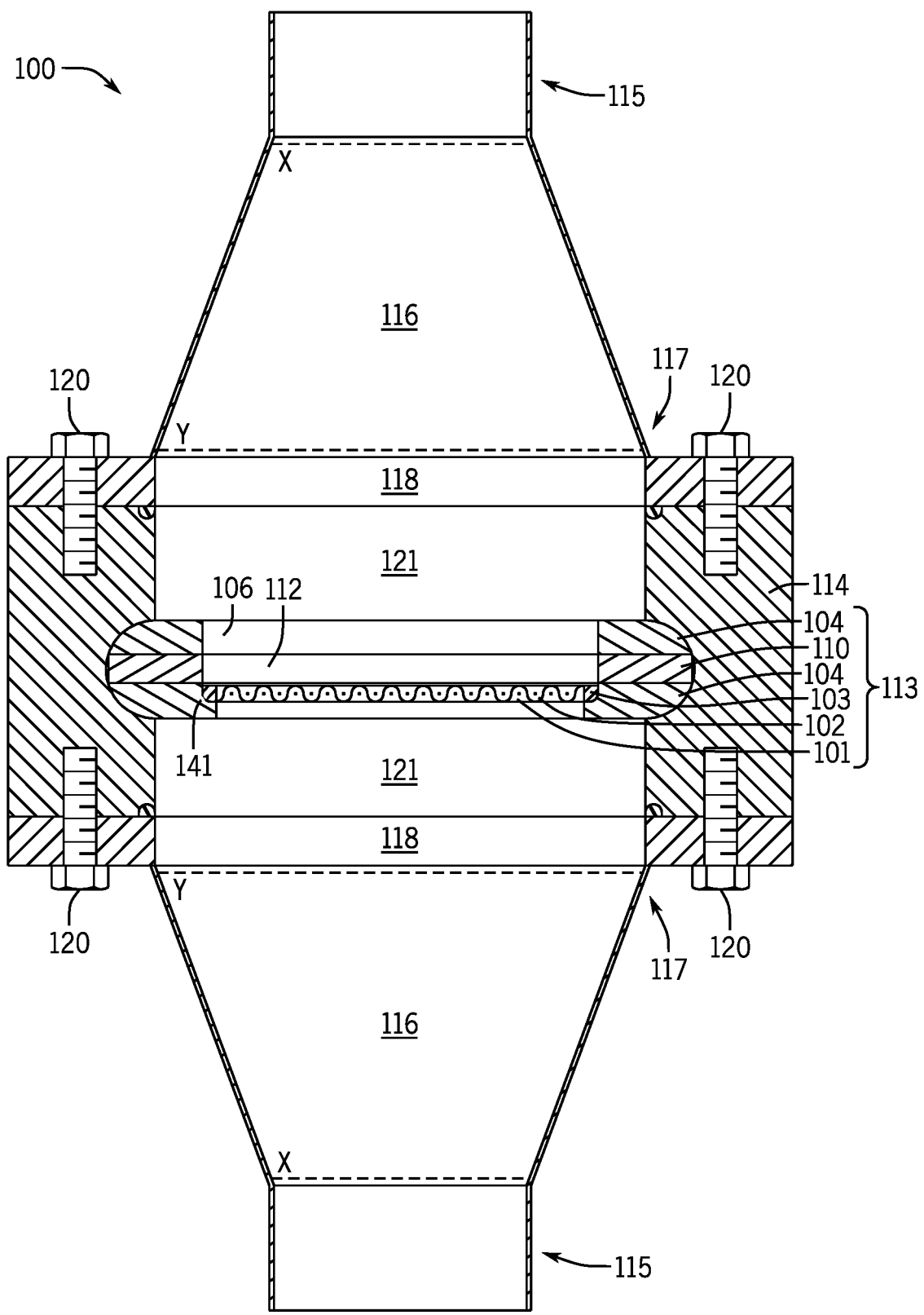
FIG. 3 is a schematic illustration of a cross-sectional side view of the housing depicted in FIG. 2, including a screen assembly inserted into the housing.

FIG. 3 is a schematic illustration of a cross-sectional side view of the housing 114 along line 2 of the embodiment of FIG. 1, with the screen assembly 113 inserted within the housing 114. The screen assembly 113, including the screen 102 supported on one end by the slidable support 104 and on a second end by the retainer plate 110, may be inserted into the screen assembly receiving portion 122. Once inserted, the openings defined by each component of the screen assembly 113, i.e., the screen-receiving opening 106 of the slidable support, the opening 112 of the retainer plate, and the through holes 101 of the screen 102, form a uniform opening aligned with the throughput portion 121 such that a flowable material passes through the screen 102 during operation of the supply line without becoming trapped or caught within the throughput portion 121. The throughput portion 121 may define an internal circumference that is at least as large as the internal periphery of the screen 102 to avoid interfering with the passage of flowable material through the screen 102. In embodiments, the width of the throughput portion 121 may range from about 2 inches to about 14 inches, about 4 inches to about 12 inches, about 6 inches to about 10 inches, or about 8 inches to about 9 inches. The shape of the throughput portion 121 defined by the housing 114 may vary. In some examples, the shape may correspond to the shape of the screen 102 placed therein, e.g., a cylindrical throughput portion 121 may be implemented in embodiments involving a circular screen 102, to reduce or eliminate surface areas within the throughput portion 121 where the flowable material may otherwise settle and accumulate if the screen 102 and throughput portion 121 were differently shaped, e.g., "dead spots." The shape of the screen-receiving opening 106 and the opening 112 of the retainer plate may also correspond to the shape of the throughput portion 121 to maintain a uniform opening through the housing 114. The throughput portion 121 may also correspond to the shape of the second end 117 of each transition port 116 to accommodate unobstructed ingress and egress of a flowable material. In embodiments, the throughput portion 121 may be approximately cylindrical, rectangular, square, rounded, rhomboidal, pyramidal or various other shapes.

In the embodiment depicted in FIG. 3, a flowable material may pass through the housing 114 in the direction of the arrows, flowing from a supply line through a first transition port 116 into the housing 114, through the screen 102, and out of the housing 114 through a second transition port 116. In some examples, a flowable material may pass through the housing 114 in the opposite direction. In some examples, the housing 114 may be oriented horizontally, such that a flowable material passes through the housing 114 in a lateral direction.

As shown in FIG. 3, the screen-receiving opening 106 defined by the slidable support 104 may include an inner circumferential lip portion 141 that protrudes radially inward to support a first end of the screen 102. In some examples, the internal circumference of the screen-receiving opening 106 may decrease from a first end of to a second end, thus defining an inverted cone shape when viewed from a cross-sectional side view. The screen 102 may rest within the screen-receiving opening 106 at the point in which the internal circumference of the screen-receiving opening 106 is smaller than the external circumferential portion 103 of the screen 102. In some examples, a first end of the screen 102 at the external circumferential portion 103 may include a bead portion configured to fit within a complementary groove portion defined by an inner circumferential edge of the slidable support 104. In some examples, the inner circumferential edge of the slidable support may include a bead configured to fit within a complementary groove portion defined by the screen 102. A bead configured to fit within a complementary groove may be used to lock the screen 102 within the slidable support 104. In embodiments, the slidable support 104 may include no movable or detachable components to receive and support screen the 102. The absence of such components may minimize the likelihood that one or more components may become loose and contaminate the flowable material passing through the screen 102.

Figure 4A:
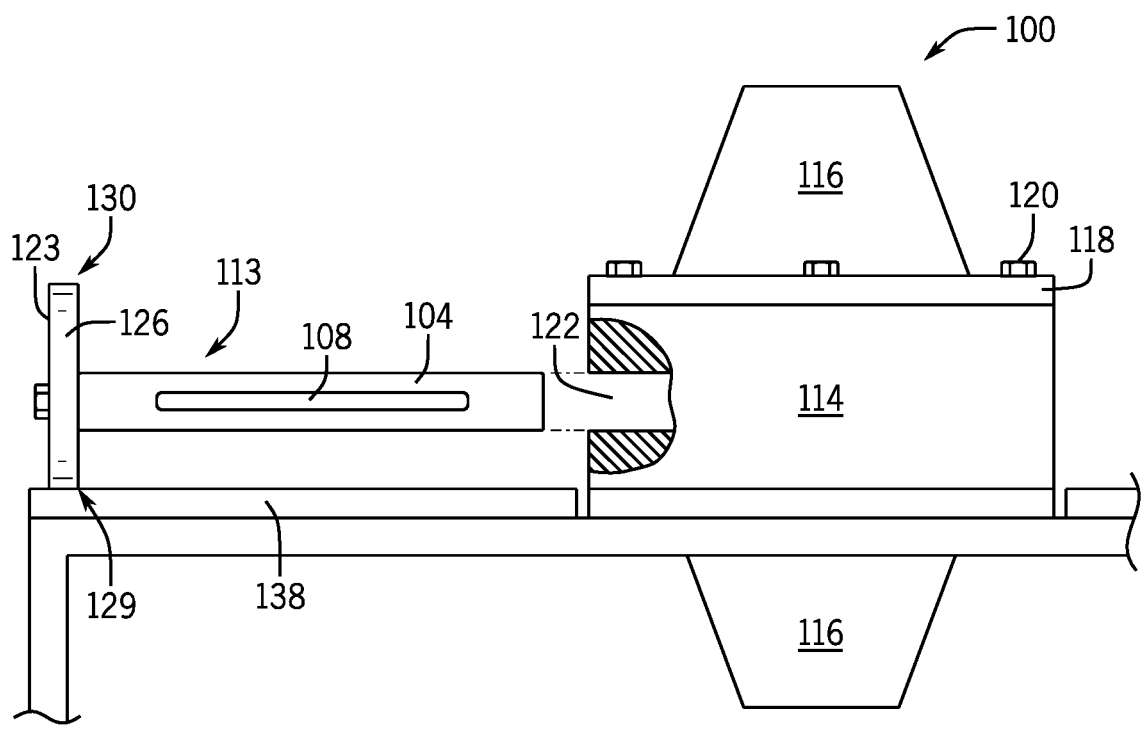
FIGS. 4A and 4B are schematic illustrations of a side view of a filtration apparatus showing the alignment of a screen assembly attached to an end cap in a first orientation and a second orientation with respect to a screen assembly receiving portion defined by the housing.
Figure 4B:
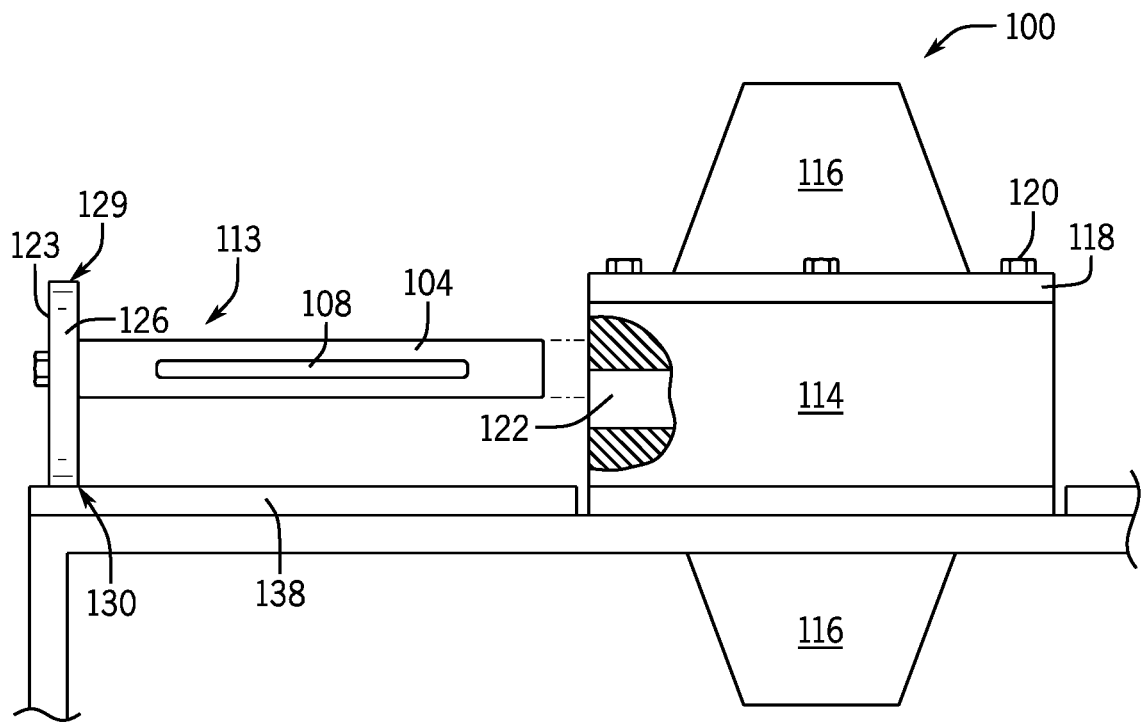

FIGS. 4A and 4B are schematic illustrations of a side view of an embodiment of a filtration apparatus showing the alignment of the screen assembly 113 with the screen assembly receiving portion 122 when attached to an end cap 123 in two different orientations. As shown, screen assembly 113 coupled to an end cap 123 may be propped on a horizontal loading surface 138. The surface 138 may facilitate the movement of the screen assembly 113 into and out of the housing 114 by providing a platform for a user to slide the screen assembly across via the end cap 123 coupled to one or more reversibly releasable handles 126. The unequal distance by which each handle 126 may extend from a vertical center of the end cap 123 defines the distance by which the screen assembly 113 is suspended above the surface 138 when coupled to the end cap 123. As a result, the distance between the slidable support 104 and the surface 138 may differ depending on the orientation of the end cap 123.

FIG. 4A illustrates the slidable support 104 coupled to an end cap 123 in a first orientation of the end cap 123. As shown, the positioning of the handle 126 in the first orientation relative to the horizontal surface 138 ensures that a first end 129 of the end cap 123 is proximate or in contact with the horizontal surface 138, thus aligning the slidable support 104 with the screen assembly receiving portion 122.

FIG. 4B illustrates the slidable support 104 coupled to an end cap 123 in a second orientation. The second orientation includes the same combination of the slidable support 104, handle 126 and end cap 123. The components may be coupled together in the same manner, but the assembly as a whole is inverted with respect to the surface 138. As shown, the positioning of the handle 126 in the second orientation relative to the surface 138 places a second end 130 of the end cap 123 proximate but spaced above the surface, thus failing to align the slidable support 104 with the screen assembly receiving portion 122.

In embodiments, one or more fasteners, e.g., bolts, screws, and/or studs, may be used to position the slidable support 104 relative to a vertical center of its corresponding end cap 123, thus aligning the slidable support 104 with the screen assembly receiving portion 122. In some embodiments, the slidable support 104 may be coupled to the end cap 123 vertically off-centered such that the fasteners of the end cap 123 align with the fasteners of the housing 114 in a single orientation. This may enable the handles 126 to assume the same or a different configuration while ensuring the slidable support 104 can be inserted one way.

In embodiments, the slidable support 104 of the screen assembly 113 may be offset from a vertical center of the end cap 123, and a distance between the loading surface 138 and the screen assembly receiving portion 122 may correspond to a distance between a first side of the end cap 123 (e.g., first end 129) and the slidable support 104 of the screen assembly 113. In such embodiments, the screen assembly 113 can be coupled to the housing 114 via one orientation due to it being aligned with the screen assembly receiving portion 122 when the first side of the end cap is supported on the loading surface 138 and being misaligned with the screen assembly receiving portion 122 when a second side of the end cap (e.g., second end 130) is supported on the loading surface 138.

FIG. 5 is a schematic illustration of a cross-sectional side view of the housing 114 simultaneously accommodating a portion of two screen assemblies 113 within the screen assembly receiving portion 122. Each screen assembly 113 may include a slidable support 104 coupled to an end cap 123, which may be coupled to at least one handle 126. As indicated by the arrows, screen assembly A may be slidably inserted through a first end of the screen assembly receiving portion 122 while screen assembly B is being slidably ejected through a second end of the screen assembly receiving portion 122, opposite the first. The end 107 of the slidable support included in screen assembly A may be pressed against the end 105 of the adjacent slidable support included in screen assembly B. Thus, by applying a lateral force to screen assembly A in the direction of the arrows, screen assembly B may be pushed out of the screen assembly receiving portion 122. The handle 126 coupled to screen assembly A may facilitate pushing of screen assembly A, while the handle 126 coupled to screen assembly B may facilitate pulling of screen assembly B.

Because a screen assembly 113 containing an unused screen 102 may be used to eject a second screen assembly 113 containing a used screen 102, the screen assembly receiving portion 122 may constantly contain at least a portion of one screen assembly 113. Use of one screen assembly to eject another screen assembly may facilitate a nearly seamless transition between screen assemblies, thus decreasing the time needed to replace a used screen with a fresh screen and minimizing the amount of flowable material wasted during the exchange process. The risk of contamination may also be reduced by eliminating the need to disconnect the housing 114 from the supply line during screen replacement. It may be unnecessary for users to reach inside the housing 114 or insert any additional pieces of equipment therein, thus reducing the likelihood of non-sterile items penetrating the interior of the housing 114. For instance, the screen opening defined by the screen assembly 113 containing the screen 102 may have a height (e.g., depth) that is larger than a height of the screen 102 so that the screen assembly 113 opening and screen 102 defines a debris retention portion that can accommodate debris trapped by the screen 102. When the screen assembly 113 is ejected, the debris in the debris retention portion is carried out of the housing 114 for subsequent removal and optionally inspection.

FIG. 5 depicts the concurrent insertion and ejection of screen assemblies 113 in one direction. In embodiments, the screen assembly receiving portion 122 may receive and/or eject screen assemblies 113 bi-directionally. In some examples, the screen assembly receiving portion 122 may include an opening at only one end of the housing 114, thus preventing bidirectional movement of screen assemblies therethrough. Such embodiments may involve inserting and removing only one screen assembly 113 at a time from the housing 114.

Figure 6:
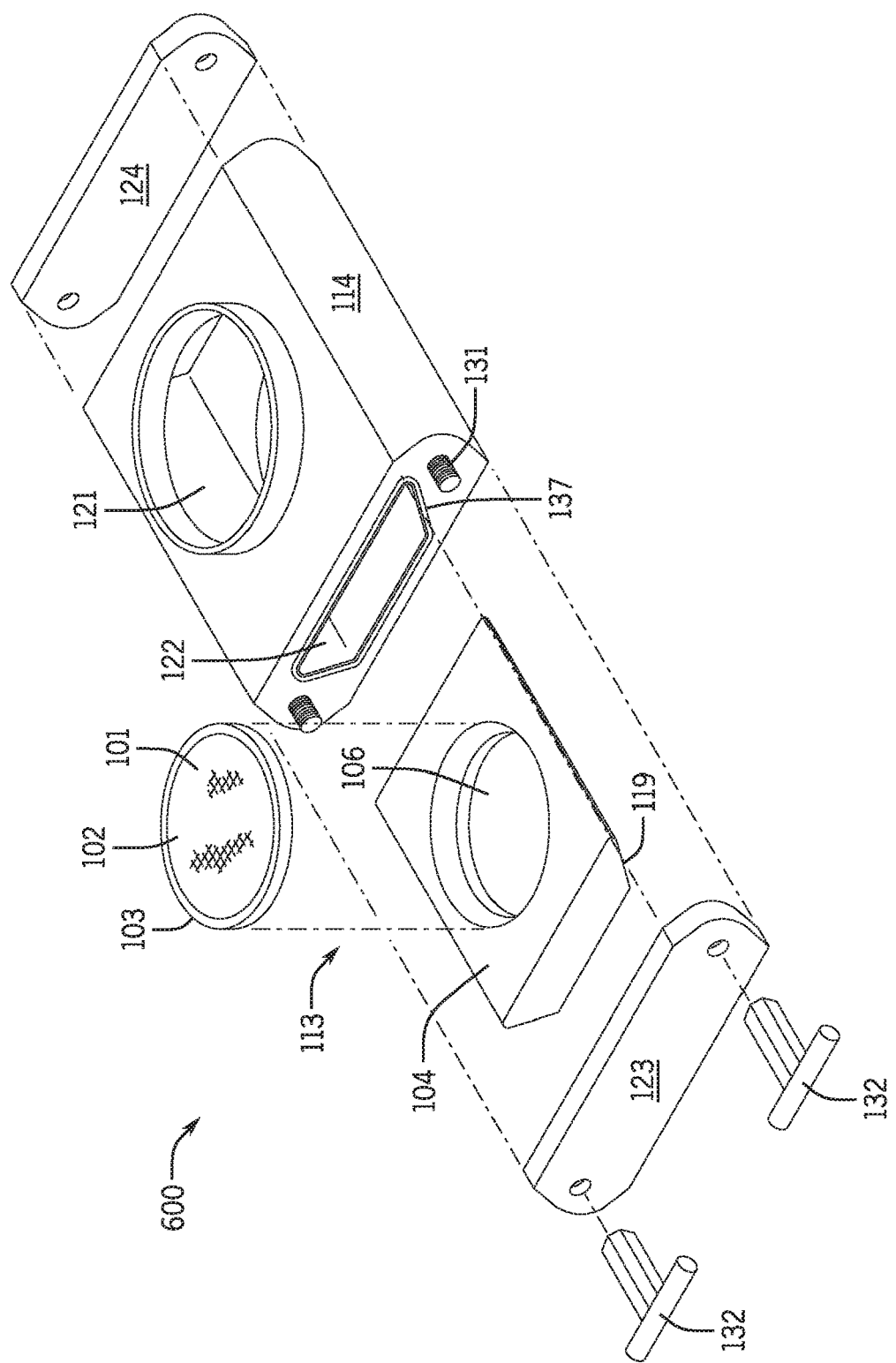
FIG. 6 is a schematic illustration of a perspective exploded view of an embodiment of a filtration apparatus.

FIG. 6 is a schematic illustration of a perspective exploded view of an embodiment 600 of a filtration apparatus, with reference numbers corresponding to the embodiment 100 described in connection with FIGS. 1-5. The throughput portion 121 may be defined by the housing 114. A transition port 116 (not shown) may be coupled to each end of the throughput portion 121 to funnel a flowable material therethrough.

As shown in FIG. 6, the slidable support 104 may lack a retainer plate receiving portion, instead defining only the screen-receiving opening 106. Alternatively, the slidable support 104 may include a retainer plate receiving portion 108 and may receive a retainer plate 110. The slidable support 104 may include at least one beveled edge 119. The beveled edge may be included on one or more side walls 109, 111 of the slidable support 104, for example. The screen assembly receiving portion 122 may include a complementary beveled edge 137. The complementary beveled edge may be included on one or more side walls of the screen assembly receiving portion 122, for example. By aligning the beveled edges 119 and 137, the slidable support 104 may be aligned with the screen assembly receiving portion 122, thus ensuring that the screen assembly 113 is properly inserted into the housing 114 and preventing the screen assembly 113 from being mistakenly inverted by a user, such that the screen 102 falls from the slidable support 104 through the screen-receiving opening 106. In embodiments, complementary beveled edges 119, 137 may ensure proper alignment of the screen assembly 113 with the housing 114 instead of the handles 126 coupled to an end cap 123. In some examples, the beveled edges 119, 137 may provide a safeguard against dislodging the screen 102 in addition to one or more handles 126. Some embodiments may include multiple beveled edges on each of the slidable support 104 and the screen assembly receiving portion 122. Additional complementary features defined by the slidable support 104 and the screen assembly receiving portion 122 may facilitate their proper alignment. For example, an inner surface of the screen assembly receiving portion 122 may define a small beaded portion. An external surface of the slidable support 104 may define a complementary groove to receiving the beaded portion, or vice versa.

As further shown in FIG. 6, the housing 114 may define various shapes and sizes. The surfaces of the housing 114 may be flat or curved. End caps 123 may be sized and shaped similarly to the cross-sectional shape defined by the housing 114.

Figure 7:
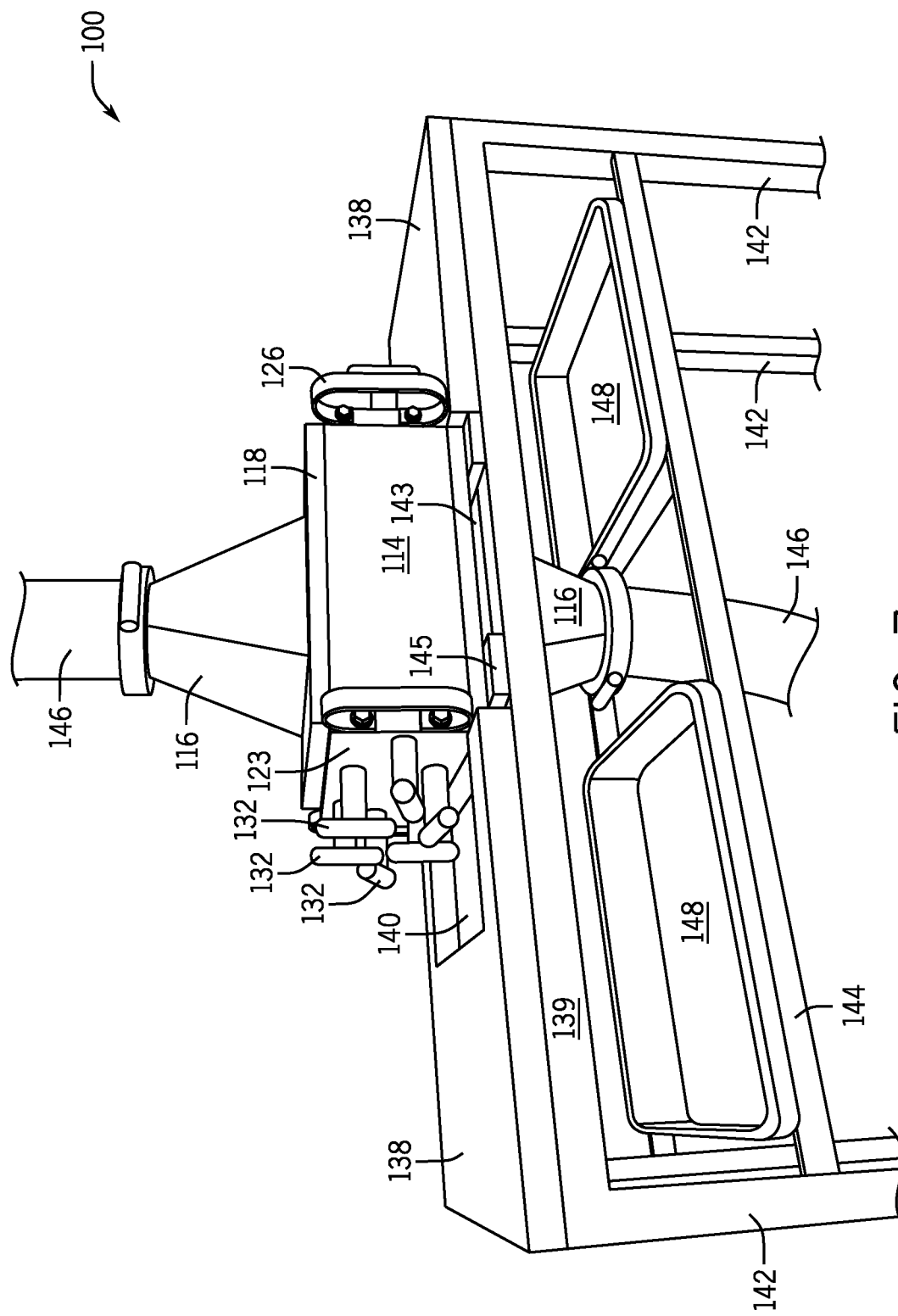
FIG. 7 is a schematic illustration of a perspective view of an assembled filtration apparatus supported on a loading surface and secured within a supply line.

FIG. 7 is a schematic illustration of a perspective view of an assembled filtration apparatus 100 supported on a loading surface 138 and secured within a supply line 146. As shown, the surface 138 may be supported on a horizontal support 139 and elevated via one or more legs 142. The surface 138 and the horizontal support 139 may each define an opening 143 configured to accommodate a supply line 146 protruding from the housing 114 via a transition port 116. The housing 114 may be supported above the opening 143 by one or more cross beams or bars 145 positioned beneath the housing 114.

An end cap 123, coupled to a screen assembly 113 and optionally at least one handle 126, may slide across the surface 138, thus facilitating movement of the screen assembly 113 directly into and out of the housing 114. The surface 138 may extend horizontally from one or more sides of the housing 114. In embodiments, the surface 138 may extend from the sides of the housing 114 that define the opening to the screen assembly receiving portion 122. To accommodate the rotation of one or more fasteners 128, e.g., T-handles, used to tighten and secure the end cap 123 to the housing 114, the surface 138 may define an opening 140 proximate to each side of the housing 114 from which the surface 138 extends.

A plurality of legs 142 may support the surface 138 at an elevated position. Thus, the surface 138, mounted on the legs 142 via the layer 139, may resemble a table-like assembly with a double-layered top portion. The height of the legs 142 may vary and may depend on the design constraints of currently-installed processing equipment. For example, the legs 142 may need to position the housing 114, supported on the surface 138, above an apparatus downstream of the filtration step. In some examples, the legs 142 may be a height such that the housing 114 may be accessed by a user standing on the floor surface upon which the legs 142 are supported. In some examples, the height of the legs 142 may be greater, such that it may be necessary for a user to climb a stool, step(s) or ladder to access the housing 114. In some examples, the height of one or more legs 142 may be adjustable. In embodiments, the height of the legs 142 may range from about 2 feet to about 10 feet, about 3 feet to about 6 feet, about 3.5 feet to about 4.5 feet, or about 3.8 feet to about 4.2 feet.

The surface 138 may comprise various materials. In some examples, the coefficient of friction between the surface 138 and the handles 126 may range from moderate to low such that the handles 126 can be slid across the surface 138 by a user with relative ease when coupled to the screen assembly 113. The surface 138 may comprise scratch-resistant material in some examples. Suitable materials for the surface 138 may include but are not limited to: nylon, one or more polymers or plastics, one or more metals, steel, stainless steel, various composite materials and/or combinations thereof.

As shown in FIG. 7, at least one cross-leg or cross-bar 144 may be secured to two or more legs 142. Cross bars 144 may provide mounting surfaces for supporting at least one tray 148. The tray 148 may support at least one component of the screen assembly 113 during replacement of the screen 102, for instance. In some examples, one tray 148 may be designated as a sterile tray, such that the tray is reserved for sterile components only, while a separate tray 148 may be reserved for non-sterile components. The use of one or more trays 148 to support various components of the filtration apparatus disclosed herein may be especially important when the housing 114 is suspended at an elevated position.

FIGS. 8A-D are schematic illustrations of a top view of an embodiment 800 of a filtration apparatus with the screen assembly 113 being sequentially assembled, inserted and secured within the housing 114. As shown, at least one cover assembly 150 may be pivotably coupled to the housing 114 to provide access to the screen assembly receiving portion 122 and allow insertion of and to secure the screen assembly 113 within the housing 114. The cover assembly 150 may replace one or more end caps 123 in some embodiments. The cover assembly 150 may be configured to rotate or pivot about a pivot point of the housing 114 which may eliminate or reduce the number of fasteners, e.g., T-handles or wing nuts, needed to tighten or loosen the cover assembly 150 with respect to the housing 114. Thus, embodiments including the cover assembly 150 may be advantageous to minimize a number of detachable components needed to replace a screen assembly, for example. Such embodiments may be particularly useful for replacing the screen 102 at elevated positions.

In embodiments, the cover assembly 150 may include a cover member 152. The cover member 152 may further include a first end 153 and a second end 154. The first end 153 may be pivotably coupled to a mechanical hinge or pivot joint 156 on a first side of the housing 114 via an arm member 155. The second end 154 may be coupled to a locking member 157, which may be configured to releasably secure the cover member 152 to a second side of the housing 114. In some embodiments, the locking member 157 may be coupled to a locking handle 160. An end plate 158 may be coupled to the cover member 152 via at least one fastener 159. The end plate 158 may include an upright panel with an inner surface configured to contact an outer surface of the housing 114 that defines an opening of the screen assembly receiving portion 122. To conceal the screen assembly receiving portion 122, the end plate 158 may have an inner surface with an external circumferential edge that is larger than a circumferential edge defined by the screen assembly receiving portion 122.

Figure 8A:
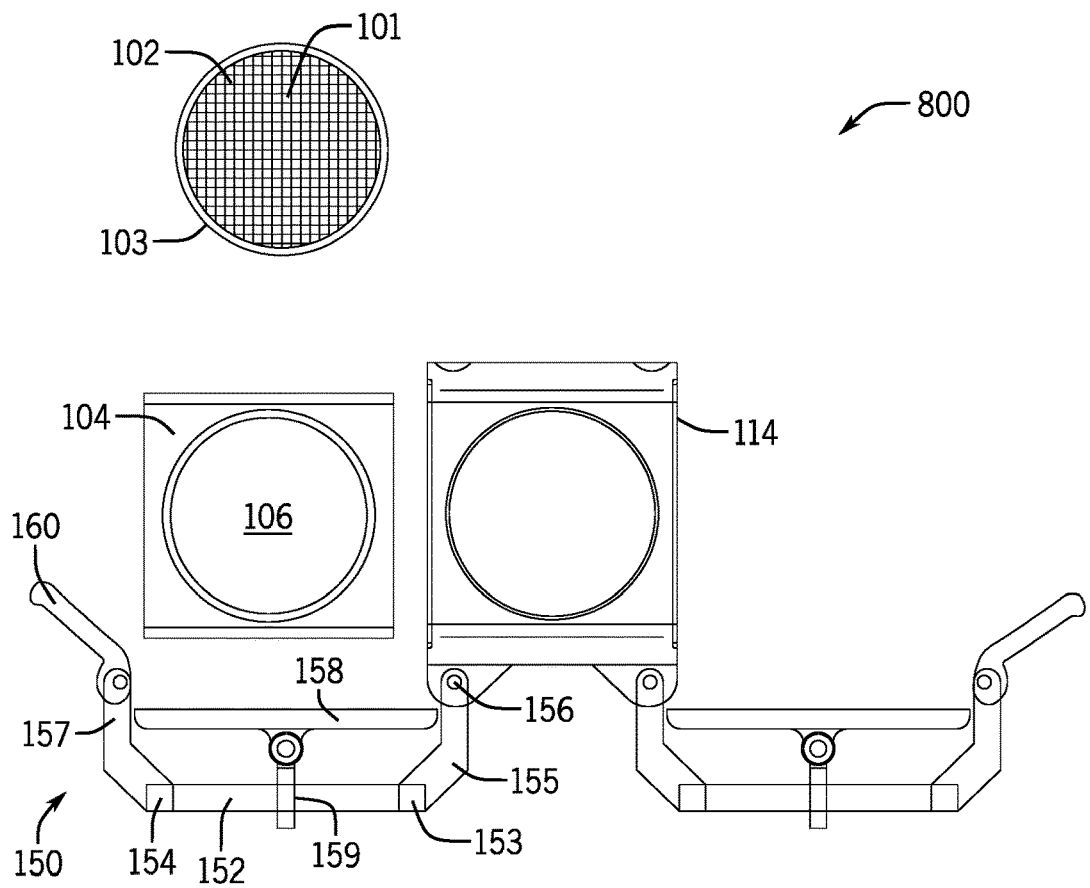
FIGS. 8A-D are schematic illustrations of a top view of a screen assembly being sequentially assembled and secured within a housing via a cover assembly pivotably coupled to the housing.

The cover assembly 150 may be positioned in an open position and a closed position. FIG. 8A illustrates the cover assembly 150 in an open position prior to assembly and insertion of the screen assembly 113 into the housing 114. As shown, the cover member 150 may be pivotably coupled to a first end of the housing 114 in the open position, while the locking member 157 may be separated from a second end of housing 114. Because the locking member 157 is not coupled to the housing 114 at the stage depicted in FIG. 8A, the cover assembly 150 may not be positioned to cover a screen assembly receiving portion 122, thus leaving the screen assembly receiving portion 122 exposed.

Figure 8B:
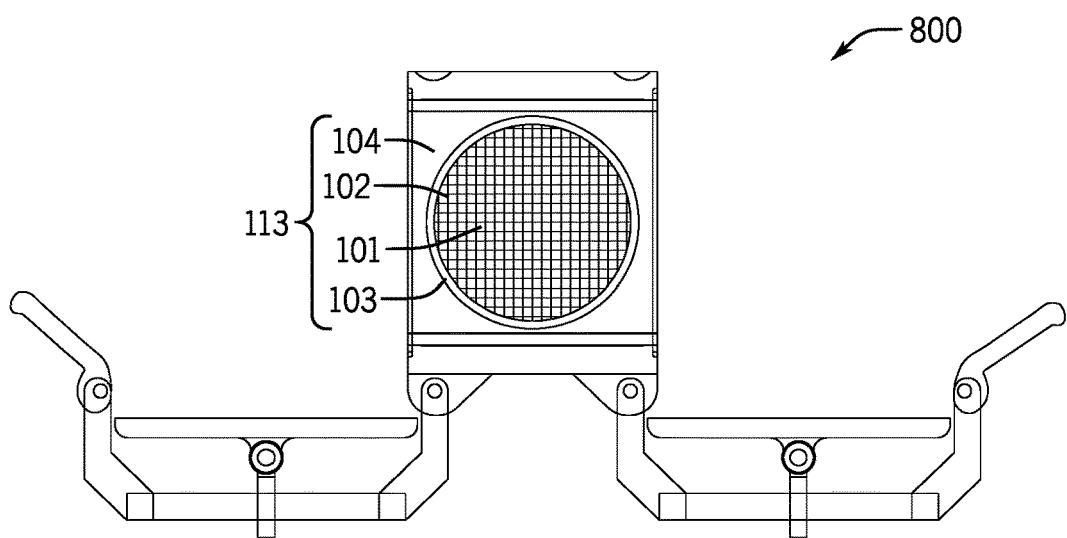

FIG. 8B illustrates the assembled screen assembly 113 containing the screen 102 inserted within the screen assembly receiving portion 122 defined by the housing 114. As shown, each cover assembly 150 remains in the open position, leaving the screen assembly receiving portion 122 exposed.

Figure 8C:
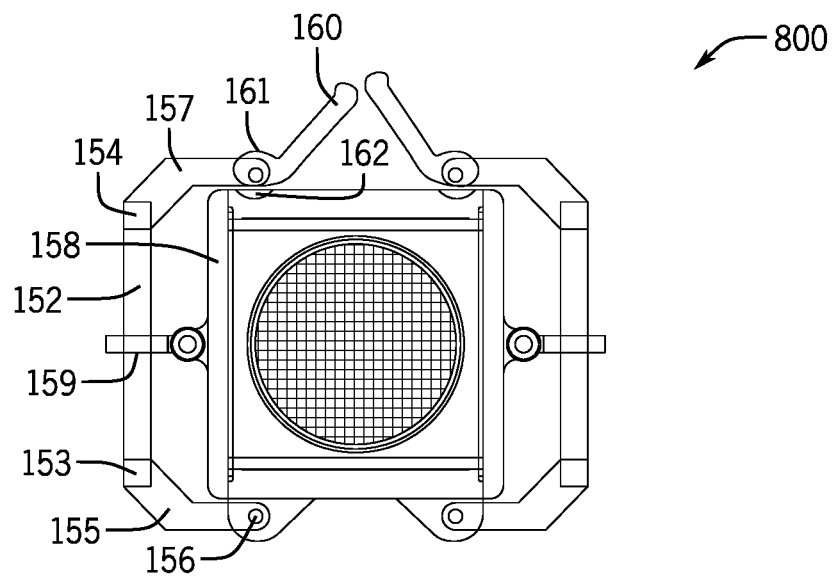

FIG. 8C illustrates each cover assembly 150 in the closed, but not locked, position. As shown, the locking member 157 is positioned at a second side of the housing 114, opposite the first side, and the end plate 158 is pressed against an outer surface of housing 114, but the locking handle 160 remains unlocked. In some examples, the locking handle 160 may comprise an elongated body pivotably coupled at one end to a mechanical hinge or pivot joint on the locking member 157. A protuberance 161 defined by the end of the locking handle 160 coupled to the locking member 157 may be configured to fit within a complementary receiving portion 162 defined by the housing 114.

Figure 8D:
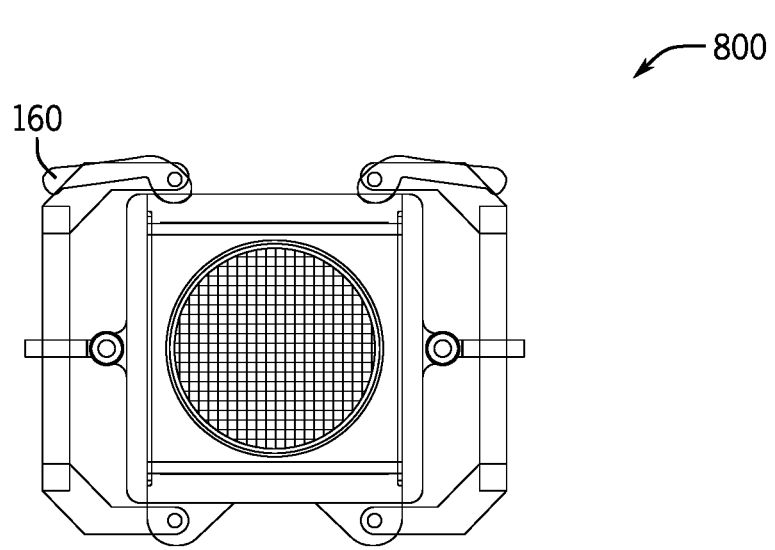

The cover assembly 150 is depicted in a closed and locked position in FIG. 8D. As illustrated, the locking handle 160 has been pivoted about the locking member 157 so that the protuberance 161 is positioned within the receiving portion 162.

In embodiments, the locking member 157 may include various locking structures configured to lock according to assorted means or mechanisms. For example, the locking member 157 may include one, unitary component, such as an elongated handle with a first end and a second end, the first end pivotably coupled to the cover member 152 and the second end defining a latch. In some examples, the latch may be configured to releasably engage with a complementary protrusion coupled to or defined by the second side of the housing 114. In some examples, the locking member 157 may include an elongated handle portion that defines an opening at one end. The opening may be configured to align with a complementary opening defined by the second side of the housing 114, with both openings configured to receive a pin when the cover assembly 150 is in the closed position, thereby locking the cover assembly 150 to the housing 114.

The components of the filtration apparatus described herein may be manufactured according to various casting processes. Welding, stamping and/or bending methods may be incorporated into the manufacturing process to couple various components and/or form various edges or surfaces. Components comprised of one or more plastic materials and/or polymer compositions, for example, may be manufactured according to various molding process, e.g., injection molding.

While this invention has been described with reference to exemplary embodiments, it will be understood by those skilled in the art that various changes can be made and equivalents may be substituted, without departing from the spirit and scope of the invention. In addition, modifications may be made to adapt the teachings of the invention to particular situations and to use other materials, without departing from the essential scope thereof. The invention is thus not limited to the particular examples that are disclosed here, but encompasses all of the embodiments falling within the scope of the claims.

What is claimed is:

1. A filtration apparatus comprising:
   a screen assembly comprising:
   a screen comprising a plurality of through holes configured to filter flowable material passing through the screen;

a slidable support configured to support the screen; and a retainer plate configured to slidably engage the slidable support and secure the screen between the slidable support and the retainer plate, the slidable support and the retainer plate each defining an opening aligned with the plurality of through holes such that the flowable material can pass through the screen via the plurality of holes;

a housing having walls that define an internal volume enclosed within the housing, at least one of the walls defining an opening through an exterior surface of the housing, wherein the internal volume comprises:

a screen assembly receiving portion enclosed within the housing and configured to slidably receive the screen assembly through the opening; and a throughput portion enclosed within the housing and extending therethrough in a direction transverse to the screen assembly receiving portion and configured to receive the flowable material;

a transition port configured to couple the housing to a supply line for delivering the flowable material to the housing;

an end cap for closing the opening at the exterior surface, wherein the end cap is releasably coupled with the screen assembly and configured to move the screen both into, and out from, the screen assembly receiving portion, and the end cap is configured to seal the screen assembly within the internal volume of the housing; and a gasket seated along a periphery of the end cap for contact with the exterior surface of the housing around the opening.

2. The apparatus of claim 1, the screen configured such that a volume of the flowable material passing through the through holes of the screen is at least as great as a volume of the flowable material passing through the supply line.

3. The apparatus of claim 1, wherein the end cap is supported on a loading surface that extends horizontally from the exterior surface.

4. The apparatus of claim 3, the end cap comprising at least one handle, the at least one handle offset from a vertical center of the end cap to define a first side and a second side of the end cap such that when supported on the loading surface, the screen assembly coupled to the end cap aligns with the screen assembly receiving portion when the first side of the end cap is supported on the loading surface and is misaligned with the screen assembly receiving portion when the second side of the end cap is supported on the loading surface.

5. The apparatus of claim 3, the slidable support of the screen assembly offset from a vertical center of the end cap, a distance between the loading surface and the screen assembly receiving portion corresponding to a distance between a first side of the end cap and the slidable support of the screen assembly, and the screen assembly aligning with the screen assembly receiving portion when the first side of the end cap is supported on the loading surface and is misaligned with the screen assembly receiving portion when a second side of the end cap, opposite the first side, is supported on the loading surface.

6. The apparatus of claim 1, the screen assembly receiving portion comprising a side wall with a beveled edge and the screen assembly comprising a side wall with a beveled edge and configured to align with the beveled edge of the screen assembly receiving portion.

7. The apparatus of claim 1, wherein the screen assembly receiving portion extends through the housing from a first end having the opening to a second end opposite the first end having another opening, the housing being configured such that the screen assembly is receivable at each of the first end and the second end.

8. The apparatus of claim 7, wherein the screen assembly receiving portion is configured to simultaneously accommodate a portion of the screen assembly near the first end and another screen assembly near the second end.

9. The apparatus of claim 1, further comprising at least one cover assembly pivotably coupled to a first side of the housing, the at least one cover assembly comprising an end plate configured to expose the screen assembly receiving portion in an open position and secure the screen assembly within the housing in a closed position.

10. The apparatus of claim 1, wherein the end cap fully covers the opening and overlaps a portion of the exterior surface along the opening.

11. A filtration apparatus comprising:

a screen assembly comprising:

a screen comprising a plurality of through holes configured to filter flowable material passing through the screen;

a slidable support configured to support the screen; and a retainer plate configured to slidably engage the slidable support and secure the screen between the slidable support and the retainer plate, the slidable support and the retainer plate each defining an opening aligned with the plurality of through holes such that the flowable material can pass through the screen via the plurality of holes;

a housing having walls that define an internal volume enclosed within the housing, at least one of the walls defining an opening through an exterior surface of the housing, wherein the internal volume comprises:

a screen assembly receiving portion enclosed within the housing and configured to slidably receive the screen assembly through the opening; and a throughput portion enclosed within the housing and extending therethrough in a direction transverse to the screen assembly receiving portion and configured to receive the flowable material;

a transition port configured to couple the housing to a supply line for delivering the flowable material to the housing; and an end cap for closing the opening at the exterior surface, wherein the end cap is releasably coupled with the screen assembly and configured to move the screen both into, and out from, the screen assembly receiving portion, and is supported on a loading surface that extends horizontally from the exterior surface.

12. The filtration apparatus of claim 11, wherein the end cap comprises at least one handle, the at least one handle offset from a vertical center of the end cap to define a first side and a second side of the end cap such that when supported on the loading surface, the screen assembly coupled to the end cap aligns with the screen assembly receiving portion when the first side of the end cap is supported on the loading surface and is misaligned with the screen assembly receiving portion when the second side of the end cap is supported on the loading surface.

13. The filtration apparatus of claim 11, wherein the slidable support of the screen assembly is offset from a vertical center of the end cap, a distance between the loading surface and the screen assembly receiving portion corresponding to a distance between a first side of the end cap and the slidable support of the screen assembly, and the screen assembly aligning with the screen assembly receiving portion when the first side of the end cap is supported on the loading surface and is misaligned with the screen assembly receiving portion when a second side of the end cap, opposite the first side, is supported on the loading surface.

14. A filtration apparatus comprising:
- a screen assembly comprising:
  - a screen comprising a plurality of through holes configured to filter flowable material passing through the screen;
  - a slidable support configured to support the screen; and
  - a retainer plate configured to slidably engage the slidable support and secure the screen between the slidable support and the retainer plate,
    - the slidable support and the retainer plate each defining an opening aligned with the plurality of through holes such that the flowable material can pass through the screen via the plurality of holes;
- a housing having walls that define an internal volume enclosed within the housing, at least one of the walls defining an opening through an exterior surface of the housing, wherein the internal volume comprises:
  - a screen assembly receiving portion enclosed within the housing and configured to slidably receive the screen assembly through the opening, wherein the screen assembly receiving portion extends through the housing from a first end having the opening to a second end opposite the first end having another opening, the housing being configured such that the screen assembly is receivable at each of the first end and the second end; and
  - a throughput portion enclosed within the housing and extending therethrough in a direction transverse to the screen assembly receiving portion and configured to receive the flowable material;
- a transition port configured to couple the housing to a supply line for delivering the flowable material to the housing; and
- an end cap for closing the opening at the exterior surface, the end cap being releasably coupled with the screen assembly and configured to move the screen both into, and out from, the screen assembly receiving portion.

15. The apparatus of claim 14, wherein the screen assembly receiving portion is configured to simultaneously accommodate a portion of the screen assembly near the first end and another screen assembly near the second end.

* * * * *